March 16, 1948. A. J. FETTIG Re. 22,986

CALCULATING MACHINE

Original Filed Aug. 21, 1936 4 Sheets-Sheet 1

INVENTOR
Arthur J. Fettig
BY
Davis, Lindsey, Smith & Ahrents
ATTORNEYS

March 16, 1948. A. J. FETTIG Re. 22,986
CALCULATING MACHINE
Original Filed Aug. 21, 1936 4 Sheets-Sheet 2
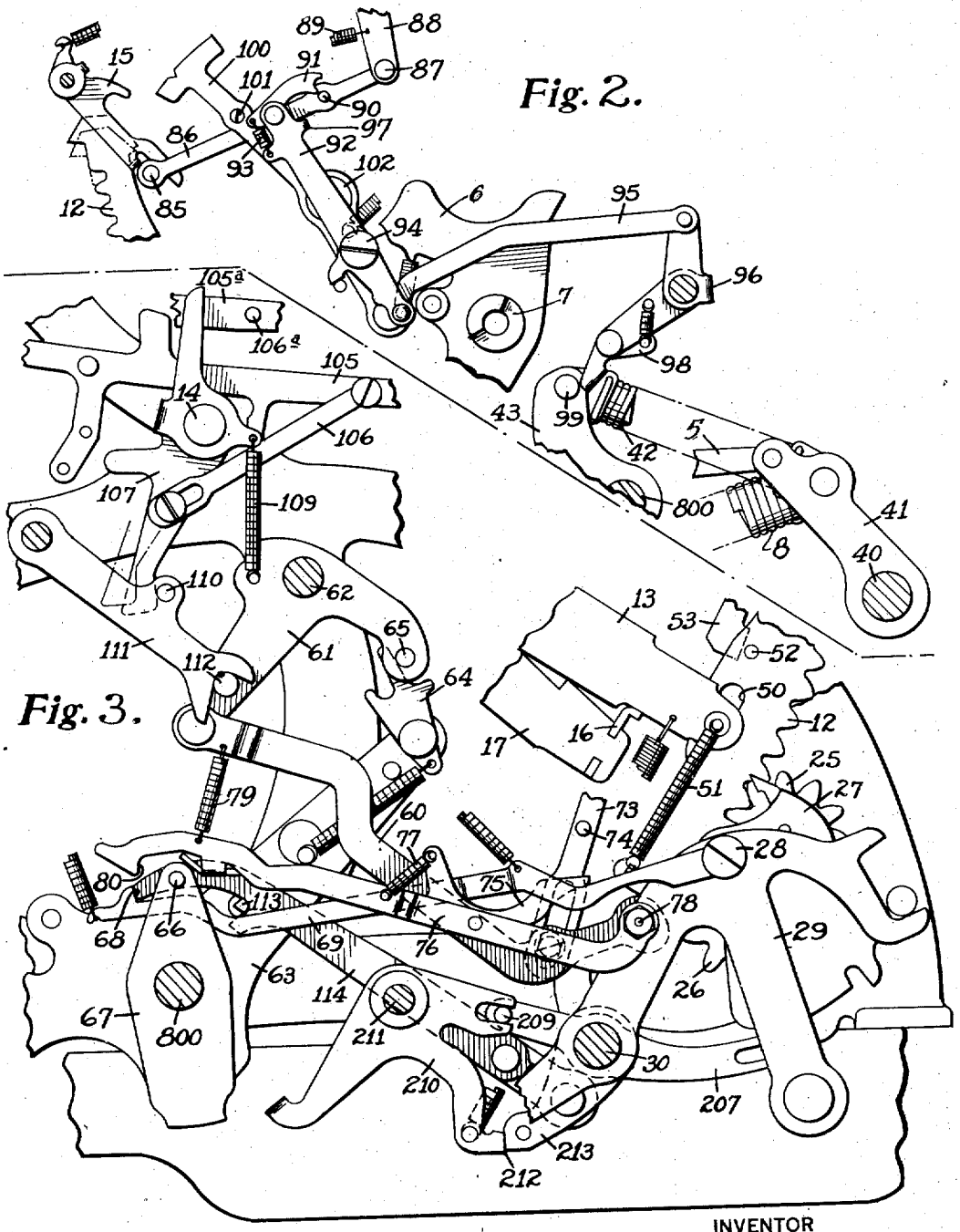
INVENTOR
Arthur J. Fettig
BY
Davis, Ludlow, Smith, & Shontz
ATTORNEYS March 16, 1948. A. J. FETTIG Re. 22,986

CALCULATING MACHINE

Original Filed Aug. 21, 1936 4 Sheets-Sheet 3

INVENTOR
Arthur J. Fettig
BY
Davis, Dudley, Smith, & Ahrens
ATTORNEYS

March 16, 1948. A. J. FETTIG Re. 22,986

CALCULATING MACHINE

Original Filed Aug. 21, 1936 4 Sheets-Sheet 4

INVENTOR
Arthur J. Fettig
BY
Davis, Lindsey, Smith & Shute
ATTORNEYS

Reissued Mar. 16, 1948

Re. 22,986

UNITED STATES PATENT OFFICE 22,986

CALCULATING MACHINE

Arthur J. Fettig, Detroit, Mich., assignor to Burroughs Adding Machine Company, Detroit, Mich., a corporation of Michigan Original No. 2,261,242, dated November 4, 1941, Serial No. 97,091, August 21, 1936. Application for reissue June 1, 1942, Serial No. 445,355

17 Claims. (Cl. 235—60)

This invention relates to a calculating machine. It relates particularly to mechanisms for improving the speed and efficiency with which totals may be taken, both positive and negative.

The general object of the invention is to provide an improved total taking mechanism for calculating machines.

A more particular object is to provide a machine in which totals may be taken without requiring spacing cycles.

A still further object is to provide an improved "fugitive 1" mechanism.

Other and more particular objects will appear from the following specification and drawings.

An embodiment of the invention is shown in the accompanying drawings, in which

Fig. 2 is a detail side elevation and section showing certain of the parts for controlling the release of the actuators during a totaling operation.

Fig. 3 is a partial left side elevation showing particularly the mechanism for engaging and disengaging the register with the actuators, the parts being shown in normal add position.

The invention is shown applied to a Burroughs high keyboard machine such as shown, for example, in Pasinski Patents Nos. 1,778,506 and 1,911,768. Since this machine is well known, the present description of it will be confined to general features and to the parts more particularly related to the present invention.

*General machine features*

Figure 1:
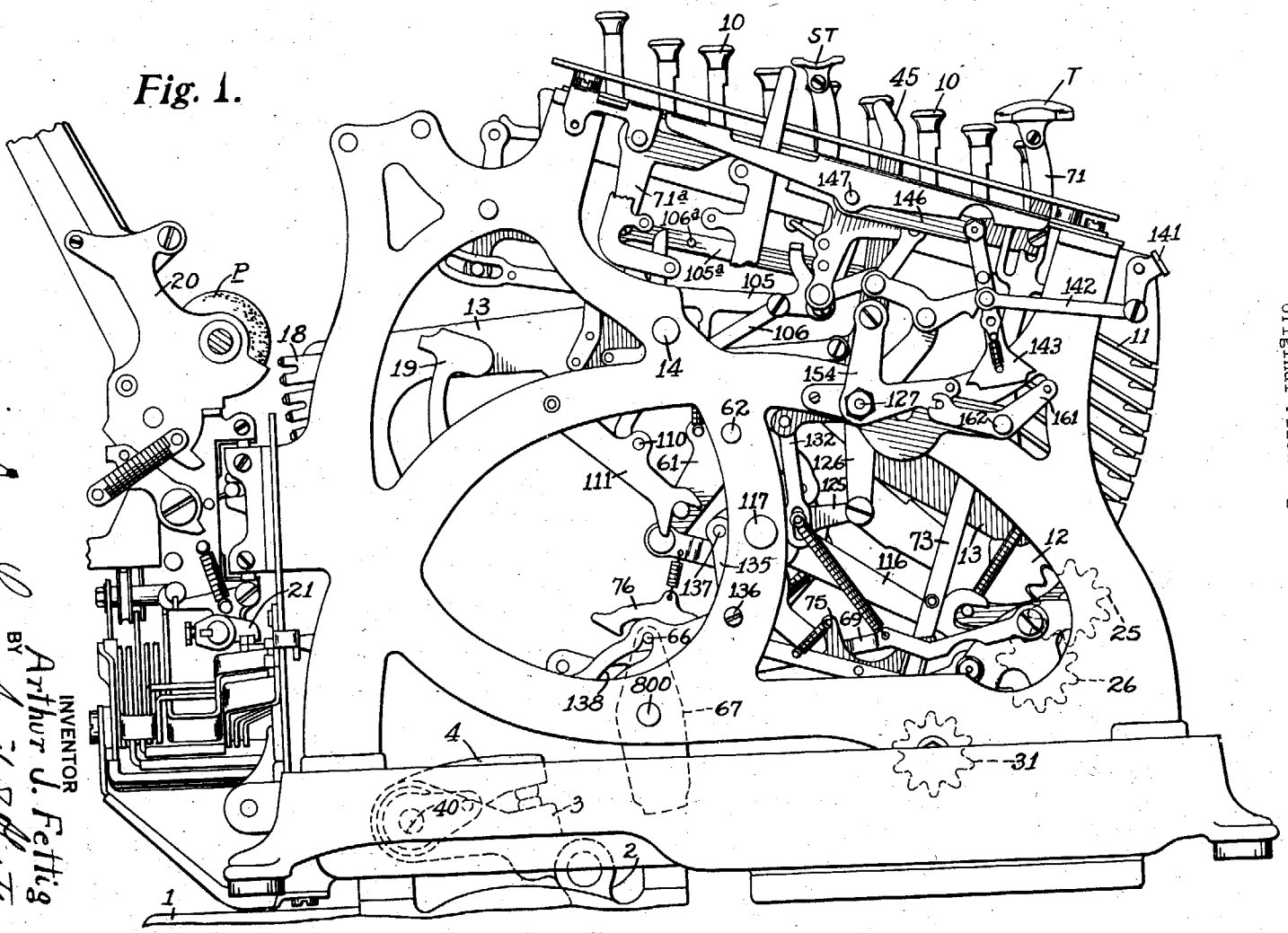
Figure 1 is a left side elevation of the machine showing the principal parts associated with the present invention, the parts being in normal position.

The machine has a plurality of banks of amount keys 10 (Fig. 1) which, when depressed, positions stop wires 11 for arresting the descent of actuators 12 (Figs. 1 and 2). These actuators are in the form of racks carried on the ends of levers 13 pivoted at 14. The actuators are normally held upward in zero position by zero stops 15 of which one is shown in Fig. 2. When a key in any bank is depressed, the zero stop for that bank is moved so as to release the actuator for said bank. The actuators are also held upwardly by a bail 16 (Fig. 3) carried by arms 17 of which one is shown in Fig. 3. When the machine is given a cycle of operation the bail 16 is moved downwardly and the actuators that have been released by depression of amount keys move down to differential positions determined by the stop wires 11 in the respective orders.

The rear ends of the levers 13 that carry the actuator racks have type bars 18 on them which are differentially positioned at the same time that the actuators are so positioned. After the actuators and type have been positioned, a printing mechanism operates, a hammer 19 of the same being shown in Fig. 1. This drives the type bars 18 against paper on the platen P.

Columnar printing is provided for by having the paper supported on a movable paper carriage 20 which is normally tabulated from column to column by a tabulating mechanism 21 operated during each cycle of machine operation.

After the actuators have been differentially positioned the register or registers are, ordinarily, rocked into engagement with the actuators, after which the latter are returned to normal by the bail 16 to enter the item in the register or registers. As shown in Fig. 1, the machine is provided with an add-subtract register of the tumbling type, comprising a set of add pinions 25 meshing with a set of subtract pinions 26. The two sets of pinions are carried by a subframe 27 (Fig. 3) which is pivoted at 28 in the main register frame 29. The latter is pivoted at 30 so that the register may be swung into and out of engagement with the racks. The subframe 27 may be rocked or "tumbled" in the main frame to enable either the add or the subtract pinions to engage the racks when the main frame is rocked.

A set of multiple registers is also provided of which one pinion is shown at 31 in Fig. 1, the multiple registers being of the construction of Patent No. 1,911,768.

The machine may be given cycles of operation either manually or by an electric motor as well known in the Burroughs high keyboard machines. An electric motor 1 (Fig. 1) is operatively connectible through a clutch as disclosed in the Bindschedler Patent No. 1,658,036 to a link 2 which is connected to an arm 3 rotatably mounted on the shaft 40 and having an abutment cooperating with another abutment on an arm 4 fixed upon the shaft 40. As shown in the Vincent Patent No. 866,750, an arm 41, also secured upon the shaft 40, is connected by springs 42 to an arm 43 secured upon the usual 800 shaft. The arm is also connected, as shown in said Vincent patent, through a link 5 to the usual full-stroke sector 6 secured upon the shaft 7 to which a hand crank may be attached when desired to cycle the machine manually. In the forward stroke of each cycle, the motor or the hand crank rocks the shaft 40 counterclockwise in Fig. 1 and clockwise in Fig. 2 and rocks the shaft 5 counterclockwise in Fig. 2. During the return stroke of the cycle, the shafts are returned in the reverse directions to their normal positions by springs 8 as shown in said Vincent patent.

Figure 4:
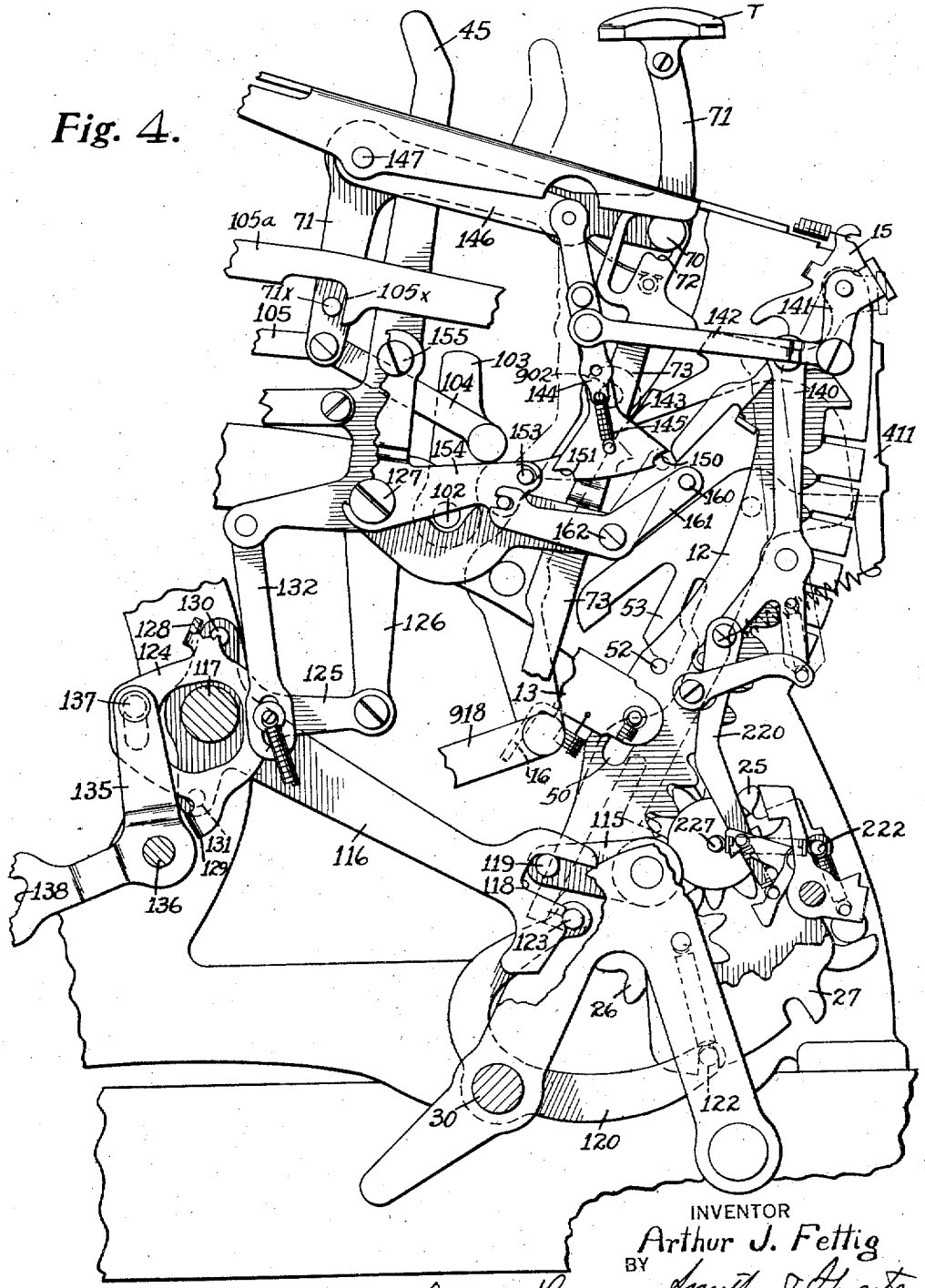
Fig. 4 is a partial left side elevation showing particularly the means for moving the register from add to subtract position, the parts being shown in normal add position.

The machine is usually conditioned for subtraction by moving a subtract lever 45 (Figs. 1 and 4) from the full-line position of Fig. 4 to the dot-dash position there shown. In the standard Burroughs machine, this positions certain mechanism described in Patent 1,778,506 so that, upon giving the machine a cycle of operation, the add-subtract register 25—26 is tumbled from add to subtract position, that is, to a position such that the subtract pinions 26 will engage the actuators when the register frame is moved to engage the register with the actuators.

Tens-transfers are effected by an extra step of movement of the actuators 12. And, for this purpose, the actuators are mounted by a pin and slot connection 50 (Fig. 3) on the arms 13, the actuators being urged upward by a spring 51 so that studs on the arms 13 are normally in the bottom of the slots in the actuators as shown in Fig. 3. As the actuators are restored upwardly to normal by the bail 16 during the return stroke of a machine cycle and, assuming that no tens-transfers are to take place, studs 52 on the actuators 12 (Fig. 4) engage projections 53 of the tens-transfer pawls. This arrests the actuators and the arms 13 move upward in slots 50 to the position of Fig. 4. If a tens-transfer is to take place, the appropriate pawl is moved to position its projection as shown in Fig. 3. Then, as the actuator for that order is moved upwardly, its stud 52 passes the projection 53 and the actuator for that order is not blocked but moves up an extra step to insert the tens-transfer.

Totals are taken by depressing a total key T which, in the standard Burroughs machine, releases the zero stops 15 (Fig. 2) for all the banks in order that, when the machine is cycled, all the actuators may descend. Depression of the total key also changes the timing of the engagement of the register with the actuators so that the register is engaged with said actuators before they descend. During the machine cycle the actuators move to differential positions determined by the arrest of the register pinions at their zero position by a well-known mechanism.

Negative totals may be accumulated and they may be taken directly. In order that the total may be accurate, a "fugitive 1" mechanism is provided. In the standard Burroughs machine this mechanism is operated by the tumbling of the register from add to subtract position and vice versa as described in Rinsche No. 1,172,484.

When the register is tumbled from one position to the other, it releases a pawl for the "units" actuator, which pawl is similar to the tens-transfer pawls for the other actuators, with the result that, when the register is in mesh with the actuators during the return stroke of the cycle, the units actuator will move a step farther in the return direction than it normally would and will thus insert a "fugitive 1" in the "units" order of the register.

Either one or two spacing cycles of machine operation may be required prior to the taking of the total, depending on whether the Burroughs machine is provided with the construction of Patent No. 1,344,070, which eliminates one cycle. The first of these cycles may be necessary because, in the immediately preceding item-entering cycle, a tens-transfer may have taken place in which case the actuators for the orders in which it took place are one step higher than normal and one step higher than the other actuators. If a total were taken with the racks in such position, it would not be correct. The actuators should start downward from their normal zero positions and not in the position they occupy when a tens-transfer has occurred. Accordingly, a cycle of machine operation is necessary to restore the racks that have moved an extra step and the tripped tens-transfer pawls. If the last item entered in the register was positive, and if the register is in positive condition, this one spacing cycle is all that may be necessary. But, if the last item was subtracted so that the register is in subtract position and, if the total in the register is positive, it is necessary to tumble the register to add position before the total is taken. Likewise, if the last item that was entered was added, but the total in the register is negative, it is necessary to tumble the register to subtraction position in order to get the correct negative total. The first spacing cycle can be employed not only to restore any tripped tens-transfer pawls and racks as above explained, but also for the purpose of tumbling the register to the correct position. But the tumbling of the register sets the "fugitive 1" mechanism by tripping the pawl for the "units" actuator. And, if the register is in a certain numerical condition, it may cause a tens-transfer to other orders. Accordingly, it is necessary to give the machine a second cycle to restore the "units" pawl and rack and any other tens-transfer pawls and racks that may have been tripped.

The present invention eliminates the necessity for these spacing cycles and enables a total to be taken on the Burroughs machine, no matter whether the total is positive or negative, by a single cycle of machine operation immediately following an item entering cycle. Three main problems are involved, which will be briefly mentioned before proceeding with the description.

The first problem is to restore the tripped tens-transfer pawls and racks prior to the total taking cycle and this must be done in a very short space of time at the beginning of the cycle, and in such a way as to avoid errors.

The second problem is to shift the register from add to subtract position, or to "tumble" it, and this must be done at the proper time in the cycle and within a short space of time.

The third problem is to insert a "fugitive 1" in the register and to do this without requiring that the machine be given a spacing cycle to take care of any possible tripping of pawls for the actuators.

*Restoring tens-transfer pawls and actuators*

As previously stated, all of the actuators should be in alignment at the time the register is engaged with the racks at the beginning of a total taking cycle. If one or more of the racks has moved an extra step because of a tens-transfer, this rack or racks must be restored to aligned position with the other racks before the register is engaged.

Normally, in a Burroughs high keyboard machine of the kind shown in the above-mentioned Pasinski Patent No. 1,778,506, the register is in engagement with the actuators. At the beginning of a cycle it is rocked out of engagement and, in addition and subtraction operations, it remains out of engagement during the forward stroke, being engaged for the return stroke but during a total taking operation the register is not disengaged at the beginning of the cycle but remains engaged with the actuators during their descent.

As previously explained, the add-subtract register, including both the add and subtract pinions 25 and 26, is carried by a main register frame, one of the side plates 29 of which is shown in Fig. 3, where it is pivoted on the shaft 30. The means for rocking the add-subtract register of the present machine into and out of engagement with the racks comprises a pitman 60 connected to an arm 61 pivoted on a shaft 62. The 800 shaft carries the usual arm 63 having a pass-by or reversible pawl 64 on its end.

At the beginning of a cycle, one of the shoulders on the pawl 64 engages the stud 65 on member 61 and rocks it counterclockwise. This moves the link or pitman 60 to the right in Fig. 3 and rocks the register frame 29 clockwise to disengage the register from the racks. This condition prevails until near the end of the forward stroke when a stud 113 on the arm 63 on the 800 shaft engages a shoulder 68 of a link 69 attached at its front end to the register frame. This pulls the register into engagement with the racks where it remains during the return stroke.

But, in total taking operations, when the total key T is depressed, a stud 70 (Fig. 4) on the total key bell-crank 71 engages a shoulder 72 on a link 73 and moves the latter downwardly. This link carries a stud 74 on its lower end (Fig. 3) adapted to engage the end of a lever 75 pivoted on an arm 76 and spring held in position by a spring 77. The arm 76 is pivoted at 78 to the register frame 29 and is normally held in the position of Fig. 3 by a spring 79. Lowering of link 73 thus lowers the arm 76 through a yielding connection comprising the lever 75 and its spring 77, which is strong enough to cause arm 76 to be moved on its pivot 78 under all ordinary conditions, but which will yield if arm 76 should be blocked. When the arm 76 is lowered, a shoulder 80 on its rear end is lowered into the path of stud 66 on the member 67 on the 800 shaft. As the machine starts to operate, after the total key is depressed, the stud 66 engages the shoulder 80, pulls the arm 76 to the rear and rocks the register frame 29 counter-clockwise to engage the register with the actuators. The parts are timed in such a way that, at the beginning of a total taking cycle, the arm 63 with its pass-by pawl 64 engages the stud 65 and rocks the register out of engagement with the racks after which, and almost immediately, the shoulder 80 is engaged by the stud 66 and the register is rocked back into engagement again. It is during this interval of time that the racks that have been moved an extra step to effect tens-transfers are restored into alignment with the other racks and it will be appreciated that this action must not only take place very quickly, but the racks must be accurately positioned with reference to the other racks in order that the registers may engage all the racks at the proper time without any movement occurring that would cause inaccuracies in the registration.

Instead of having a total key release all the zero stops 15 shown in Fig. 2, as is ordinarily the case in a Burroughs machine, these stops are allowed to remain in latching position and the total key does not directly affect them. As the machine cycle starts, the bail 16 moves downward, which frees the arms 13 for downward movement. The racks that are in zero position are held by their zero stops 15 and cannot move downward but their arms 13 can move down until their studs seat in the bottom of slots 50 in their racks. In orders in which the racks have been moved an extra step of movement, the racks can move downwardly one step until their shoulders engage their zero stops 15 where they are in alignment with the other racks. Their arms 13 are already in the position of Fig. 3 relative to their racks 12, and no further movement of arms 13 will occur immediately. In this manner, the zero stops are used to hold the racks that have not moved an extra step in the tens-transfer, and to arrest the racks that have moved the extra step when the latter are restored one step downwardly into alignment with the other racks. The parts are timed so that immediately after this occurs, or almost simultaneously with it, the register is engaged with the racks. Then the zero stops are retracted by mechanism as follows:

Positioned under the tails of the zero stops 15 is a bail 85 (Fig. 2) carried by arms 86 of which one is shown in Fig. 2. These arms are pivoted on a shaft 87 carried by arms 88 which are pivoted to the machine frame and urged to the left as viewed in Fig. 2 by springs 89. The arm 86 shown in Fig. 2 has a stud 90 adapted to be engaged by a pawl 91 pivoted on the end of a lever 92, said pawl being normally held out of the path of said stud by a spring 93. A lug 97 on the lever 92 extends under the arm 86 of Fig. 2 and holds the arms 86 and the bail 85 against movement downward about the shaft 87. The lever 92 is pivoted at 94 and connected by a link 95 to one arm of a yoke 96 having another arm carrying a pass-by pawl 98. This pass-by pawl is in the path of a stud 99 on the arm 43 that is rocked when the 800 shaft is rocked. When the 800 shaft is rocked clockwise at the beginning of the machine cycle (Fig. 2) stud 99 engages the pass-by pawl 98 and rocks the yoke 96 counterclockwise. This pushes the link 95 to the left and rocks the lever 92 clockwise. When the pawl 91 is above the stud 90 nothing happens, but when the total key is depressed, the pawl 91 is lowered. This is due to the fact that, when said key is depressed, an arm 100 is rocked clockwise. The arm carries a stud 101 which engages the top edge of pawl 91 and cams it downward. Arm 100 is rocked by a shaft 102 which extends across the machine. This shaft 102 (Fig. 4) has an arm 103 connected to it, which, in turn, is connected to a link 104 that is attached to one arm of the total bell crank 71. Depression of the total key rocks bell-crank 71 clockwise, which rocks shaft 102 counterclockwise in Fig. 4, or clockwise in Fig. 2, and this moves arm 100 clockwise to lower pawl 91.

The tens-transfer pawls are restored at the beginning of the machine cycle by tripping their latches 411 by means of the usual bail 902 (Fig. 4) operated from the 800 shaft by the arm 918 as illustrated and described in Magnus 1,396,716, the timing being controlled by the shape of the connection between said arm 918 and the arm 63 (Fig. 3) so that said arm 918 is moved at the beginning of the machine cycle to restore the ten-transfer pawls at that time. This restoring mechanism has been used for many years on the Burroughs machine illustrated and described herein, and the time when the tens-transfer pawls are restored is changed to suit requirements by changing the shape of the connection above mentioned.

At the beginning of a machine cycle, and as the lever 92 is rocked clockwise, the bail 85 is moved to the right to retract the zero pawls 15.

The register must be rocked out of engagement with the actuators for the return stroke of the machine and mechanism is provided which is conditioned by the total key for this purpose. Referring to Fig. 4, the total key bell crank 71 is connected to a link 105 which is a well known part of the Burroughs machine. Connected to this link (Fig. 3) is another link 106 that has a stud and slot connection at its rear end with a member 107 pivoted at 14 and urged clockwise by a spring 109. The lower end of the member 107 is positioned adjacent a stud 110 on a pivoted arm 111 having a cam end adapted to engage a stud 112 on the member 61. During add and subtract operations, that is, when the total key is not depressed, the lower end of member 107 is in position to prevent the pawl 64 on arm 63 from moving behind stud 110 as the arm 63 reaches the end of its counterclockwise movement. But, when the total key is depressed, links 105 and 106 are moved rearward and member 107 is freed for a limited movement clockwise under the urge of its spring 109. The lower end of member 107 is moved to the dot-dash position of Fig. 3, where it does not interfere with pawl 64. Then, near the end of the forward stroke, pawl 64 moves behind stud 110 and, at the beginning of the return stroke, said pawl acts on stud 110 to rock arm 111 counterclockwise. This rocks member 61 counterclockwise to disengage the register from the actuators. Near the end of the return stroke, a stud 113 (Fig. 3) engages a lug on a link 114 connected to the register frame to again rock the register into engagement with the racks.

In subtotal taking, depression of subtotal key ST (Fig. 1) rocks a bell-crank 71a which moves a link 105a rearward. The link 105a has a shoulder 105x (Fig. 4) which, when the link 105a moves rearward, engages a stud 71x on the total key bell crank 71 and rocks said bell crank clockwise to total-taking position. The link 105a, however, has a stud 106a on it that holds member 107 (Fig. 3) against movement, even though links 105 and 106 are moved rearward by the total key bell crank 71. The member 107 thus remains in position to interfere with pawl 64 and the register remains in engagement with the actuators during the return stroke of the machine.

To summarize briefly, when the total key is depressed, the timing of the register moving mechanism is changed so that the register is moved out of engagement with the actuators and then immediately reengaged. While the register is disengaged, the racks that have moved an extra step for tens-transfers, together with their pawls, are restored, the alignment being insured by a special control of the zero stops. While the racks are held in alignment by the zero stops, the register is reengaged, after which the zero stops are immediately released. This makes a spacing stroke unnecessary as far as the restoration to the tens-transfer mechanism is concerned.

*Changing the add-subtract position of the register relative to the actuators*

If the total is to be taken by a cycle of machine operation following an item-entering cycle, and if the machine is to be capable of taking both positive and negative totals, the add-subtract position of the register must be the correct one at the beginning of the cycle, that is, before the actuators are moved. The present machine provides for doing this automatically during the short time that the register is disengaged from the racks at the beginning of the cycle.

As previously explained, the usual Burroughs machine has a subtract lever 45 which may be shifted from add to subtract position and vice versa to set certain mechanism which, during the first half of a cycle, or the forward stroke, tumbles the register to the correct position. But there is plenty of time for this tumbling in the standard machine because the register is out of engagement with the racks while they descend in add or subtract operations and, if a total is taken, they are tumbled by a blank or spacing cycle of operation. The present machine provides for tumbling the register automatically and during the short time that it is disengaged from the actuators at the beginning of the total taking cycle.

As already explained, the add-subtract register comprises a set of add pinions 25 meshing with a set of subtract pinions 26, both sets being carried by a sub-frame 27 mounted to rock or "tumble" in the main register frame 29. Connected to the shaft on which the sub-frame 27 is mounted is a crank 115 (Fig. 4). The register is shown in add position in Fig. 4 but, if the crank 115 is moved clockwise from its Fig. 4 position, it will tumble the register sub-frame clockwise to rock the register to subtract position, it being understood that this tumbling occurs when the register is disengaged from the actuators. The add-subtract relation of the engagement or connection between the register and actuators is thus changed from one of addition to one of subtraction. Obviously, a reverse movement of the crank 115 changes the register from subtract to add position and changes the relation of the actuators and register accordingly.

The register is changed from add to subtract position and vice versa by an arm 116 (Fig. 4) pivoted on the shaft 117. This arm has a slot 118 in its right-hand end straddling a stud 119 on the crank 115, the slot being wider than the stud. The arm 116 also serves to unlatch the tumbling frame which is normally held in the position it occupies by a spring-pressed detent 120 pivoted at 30. The detent has a stud 122 upon its right-hand end (Fig. 4) which engages in a slot in the sub-frame 27 that carries the register pinions. It also has a stud 123 on its other end engaging a cam portion on the end of arm 116. If the arm 116 is rocked counterclockwise from the position of Fig. 4, its cam end first acts on stud 123 to rock the detent 120 to a released position after which the lower edge of the notch 118 in the arm 116 engages stud 119 and rocks the register from add to subtract position. When the arm 116 reaches its upper position its cam end passes the stud 123 and allows the detent 120 to move back to latched position to hold the sub-frame in subtract position. When the arm 116 is moved in the reverse direction from subtract to add position, the cam edge or end of the arm again acts on the stud 123 to release the detent 120 after which the upper edge of the slot 118 engages the stud 119 and rocks the register from subtract to add position.

The arm 116 is moved at the proper time at the beginning of the cycle of machine operation by an irregularly shaped member 124 having an arm 125 pivoted to a link 126 that, in turn, is pivoted on a stud 127. The member 124 has an upper lug 128 and a lower lug 129 which are adapted alternately to be positioned to the rear of studs 130 and 131 respectively on extensions of the arm 116. The member 124 is positioned by the subtract lever 45 which is also pivoted on the stud 127 and whose lower offset end is connected to a link 132 that, in turn, has a stud and slot connection with the arm 125 on member 124. As shown in Fig. 4, the lug 128 is in position to act on the stud 130, that is, it would act if the arm 116 were in subtract position instead of the add position shown in Fig. 4. For example, if the member 124 were then moved forward, or to the right in Fig. 4, and if stud 130 were immediately in front of lug 128 as it would be if the arm 116 were in subtract position, lug 128 would engage stud 130 and rock the arm 116 clockwise.

The member 124 is rocked by means of a bell crank 135 pivoted at 136 to the machine frame. The upper arm of this bell crank has a stud and slot connection 137 with the member 124. The lower arm of the bell crank has a slot 138 (Fig. 1) adapted to be engaged by the stud 66 and carried by the lever 67 on the 800 shaft. These latter parts are constructed so that, at the very beginning of a cycle of machine operation, the bell crank 135 is rocked clockwise which moves the member 124 forward.

If the subtract lever 45 is moved from the add or full line position of Fig. 4 to the dot-dash or subtract position, the link 132 will pull the member 124 upwardly so that the lug 129 will be behind the stud 131. Then, at the beginning of the next cycle, as the member 124 is moved forward the arm 116 will be rocked counterclockwise to shift the register from add to subtract position. With the register and arm 116 in this position, if the subtract lever 45 is moved back to add position, the lug 128 will be moved behind the stud 130 so that, upon the next cycle, the arm 116 will be rocked clockwise from subtract to add position.

The parts are timed so that the shifting of the register from add to subtract and vice versa does not occur until after the main register frame has been moved to disengage the register from the actuators. As previously explained, the register is moved out of engagement with the actuators at the very beginning of the cycle. While the parts just described for shifting the register from add to subtract position move at the beginning of the cycle also, they are timed by the width of the slot 118 relative to stud 119 and by adjustment of the parts, to cause the register to first be disengaged and then tumbled. The tumbling occurs quickly and before the register is reengaged.

*Determining the add-subtract position of the register in accordance with the sign of the total*

The total is taken by depressing a total key as previously described. When a positive total is to be taken the register must be in add position and when a true negative total is to be taken the register must be in subtract position. The register can be shifted from add to subtract position and vice versa at the beginning of the cycle depending upon the position of the subtract lever 45 as just explained. But, unless means is provided to make it unnecessary, the subtract lever would have to be shifted by hand. The present invention provides for automatically moving the subtract lever to proper position upon depression of the total key and in accordance with the sign of the total in the register. It will be understood that the subtract lever may also be operated by hand when desired.

The standard Burroughs machine is usually provided with a negative total lock including a member 140 (Fig. 4) that is shifted by the register pinion of highest order from one position to another depending upon the sign of the total. This mechanism is explained in detail in Patent No. 1,778,506. When a negative total occurs the member 140 is shifted from the full line to the dot-dash position of Fig. 4 and vice versa. This member 140 is controlled by the pinions of highest order of the register, that is, by the highest order add and subtract pinions. This control is exercised through the pawls 287 and 288 (Fig. 7), which have the same reference numerals applied to them as in Patent No. 1,778,506 where their operation is explained in detail. In the present invention the member 140, instead of being connected to a negative total lock is connected to one arm of a bell crank yoke 141 whose other arm is connected to a link 142 that, in turn, has a yielding connection with an arm 143. This yielding connection is made by connecting the end of link 142 to an arm 144 pivoted on arm 143, the arm 144 being held in central position by a spring 145. The upper end of the arm 143 is pivoted on an arm 146 fixed to the shaft 147 to which the total key bell crank 71 is also fixed. The lower end of arm 143 has a broadened portion having right- and left-hand notches 153 and 151. When arm 143 is in the dot-dash position of Fig. 4, the left-hand notch 151 is adapted to engage a stud 153 on one arm of a bell crank 154 pivoted on stud 127, the other arm of the bell crank being fastened to the subtract lever at 155. When arm 143 is in the full line position of Fig. 4, the notch 150 is adapted to engage a stud 160 on a lever 161 pivoted at 162 and connected to bell crank 154 by a pin and slot connection as shown.

Assume that a negative total occurs and that the member 140 controlled by the register is moved from its full to its dot-dash position of Fig. 4. This rocks the bell crank yoke 141 to the dot-dash position shown and moves the arm 143 to its dot-dash position where the notch 151 is over the stud 153. With the parts in this position, when the total key T is depressed, the arm 143 will be lowered, the bell crank 154 will be rocked clockwise and the subtract lever will be rocked from its full to the dot-dash position, that is, from add to subtract position. Thus, upon depression of the total key the subtract lever is moved to a position corresponding to the sign of the total and, at the beginning of the cycle of machine operation, the register will be tumbled to subtract position while it is momentarily disengaged from the actuators.

If the total goes positive again, the register controlled member 140 will be rocked from the dot-dash to the full line position of Fig. 4 which will rock the yoke 141 counterclockwise, and move the link 142 and the arm 143 to the full line position where the notch 150 will be over the stud 160 on member 161, the latter having moved to the dot-dash position in the prior operation. With the parts in this position, if the total key is depressed, the subtract lever will be rocked from subtract to add position and, at the beginning of the total taking cycle, the register will be tumbled from subtract to add position.

From this it will be seen that the register sets a mechanism in accordance with the sign of the total of the register, the total taking control means sets the mechanism still further, and said mechanism is operated at the beginning of the total taking cycle to condition the machine for taking the kind of total that is in the register.

*"Fugitive 1" mechanism*

It still remains to insert a "fugitive 1" in the register at the proper time and to do this without requiring that the machine be given a spacing cycle. This result is accomplished by mechanism that is believed to be new in the art.

Figure 5:
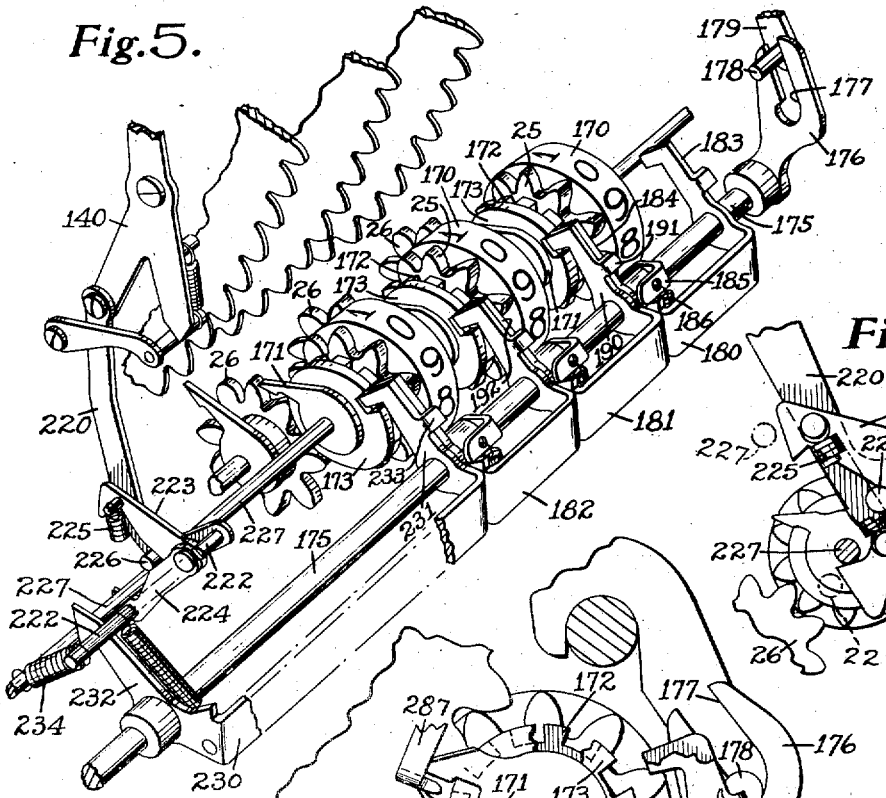
Fig. 5 is a partial perspective of the register as viewed from left front corner of the machine, the view showing the parts in moved position as the register is being changed from add to subtract position and with the register add pinions in their zero positions.

Referring to Figure 5 three orders of the register are shown, this number being deemed sufficient for purposes of illustration, it being understood that the machine ordinarily has anywhere from 9 to 17 orders, or banks. The add-subtract register pinions at the right comprise the "units" order and, for purposes of illustration, the ones at the left will be considered the highest order of the register. The highest order pinions are the ones that control the negative member 140 previously mentioned.

Each of the add pinions 25 is provided with the usual indicating dial 170 and with a cam 171 for operating the tens-transfer mechanism. In the present instance, the pinions carry two additional disks, one disk 172 being located immediately to the left of the pinion and the other 173 being located between the first and the cam 171.

Mounted in front of the register and carried by the main register frame 29 (Fig. 7) as distinguished from the tumbling sub-frame 27, is a shaft 175 whose right-hand end (Fig. 5) has an arm 176 fixed to it. This arm has a cam slot 177 operating on a stud 178 carried by an arm 179 that is fixed to the machine frame.

Pivoted on the shaft 175 is a series of yoke members 180, 181 and 182 having arms provided with noses adapted to engage in notches in the disks 172 and 173. The right-hand arm 183 of the yoke 180 for the "units" order is of no particular use in this order, it having been illustrated simply because the yokes for all orders are made alike. The left-hand arm 184 of yoke 180 has a nose adapted to engage any one of ten notches in the disk 172, such ten notches corresponding to the ten different positions of the register pinions. Fixed to the shaft 175 between the two arms of each yoke is an arm 185 having a lateral lug which engages the upper edge of the respective yoke. A spring 186 is connected between arm and the yoke and serves to urge the yoke counterclockwise as viewed in Figs. 5 and 7.

The yoke 181 between the units and tens orders has a right-hand arm 190 provided with a nose adapted to engage in a single notch in disk 173 on the units order pinion. This arm 190 also has a lug 191 overlapping the arm 184 of the yoke 180. The left-hand arm 192 of yoke 181 has a nose adapted to engage any one of the ten notches in the disk 172 attached to the "tens" pinion.

The yoke 182 between the "tens" and the "hundreds" orders is similar to yoke 181.

Figure 7:
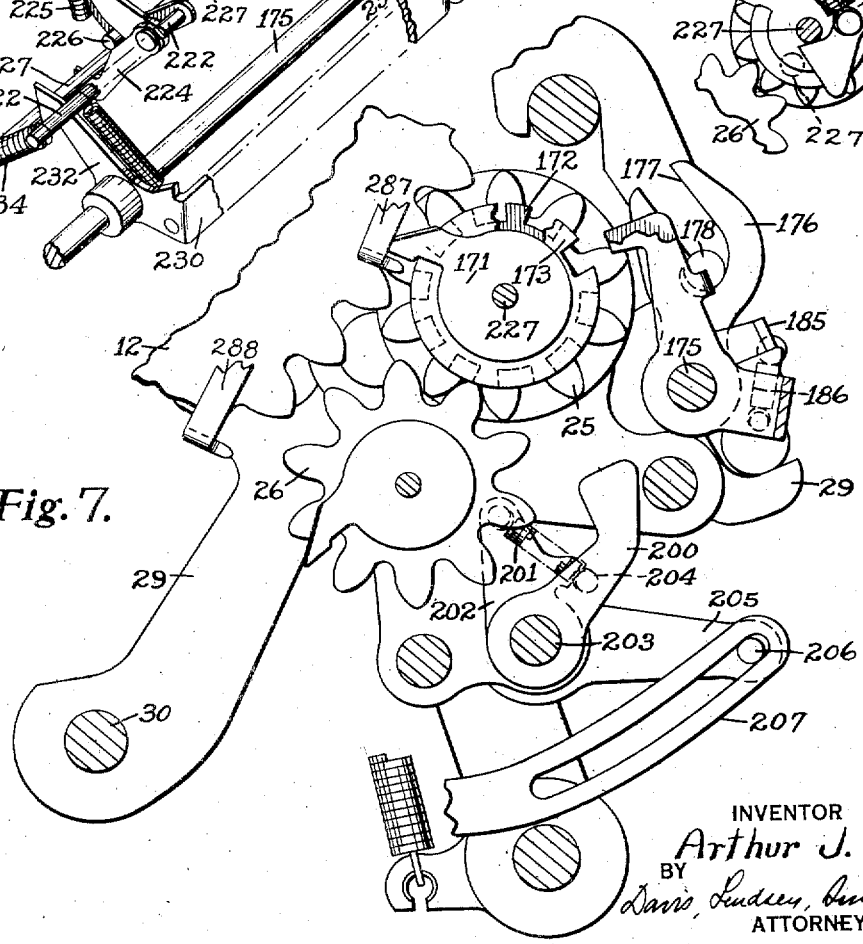
Fig. 7 is an enlarged detail sectional elevation of the register with the parts in normal add position.

When the register is engaged with the actuators as shown in Fig. 7, the fixed stud 178 operating in the cam slot 177 in the arm 176 causes the shaft 175 to occupy a position such that the arms 185 position the yokes 180, 181, 182 with the noses of their side arms out of engagement with the disks 172 and 173. But, when the register moves out of engagement with the actuators, the cam slot and the stud rock the shaft 175 counterclockwise, and the arms 185 acting through springs 186 cause the yokes to be moved so that their noses engage the disks (Fig. 5). This action takes place as the register is moved out of engagement with the actuators and before the register is tumbled. The nose of the "units" yoke 180 will engage in one of the ten notches in the "units" disk 172. The nose on the right-hand arm 190 of yoke 181 will engage the edge of the disk 173 on the "units" pinion unless this pinion happens to be in a position such that its single notch is aligned with said nose. If the nose engages the edge of disk 173 the yoke 181 is held in a position such that the nose on its left-hand arm 192 does not enter any of the notches in the disk 172 on the "tens" pinion. The yokes in the higher orders are also held out by the overlapping lugs 191. The disks 173 are secured to their respective pinions 25 in such relation to the latter and the dimensions and arrangement of the various parts are such that, with the tumbling frame 27 in the add position as in Fig. 7, the single notches in the disks 173 will be aligned with the noses on the right-hand arm of the respective yokes 180, 181 and 182 when the respective pinions 25 are in their "0" positions and, while the tumbling frame 27 is in the subtract position, said notches in the disks 173 will be aligned with said noses when the respective pinions 25 are in their "9" positions. If the frame 27 is in the add position and the "units" pinion is a "0" and the nose on arm 190 enters the notch in "units" disk 173, the yoke 181 moves so that the nose on its left-hand arm enters one of the ten notches in the disk 172 on the "tens" pinion. If the "tens" pinion is in "0" position, the notch in its disk 173 is in position to receive the nose on the right-hand arm of yoke 182, etc., this arrangement being carried through the higher orders.

Assume that the register is tumbled from add to subtract position after it is rocked out of engagement with the actuators but that none of the register pinions is in "zero" position. As the register moves out of engagement with the actuators, the nose on the left-hand arm 184 of yoke 180 will enter one of the notches in disk 172 on the "units" pinion, but none of the noses in the higher orders will enter any notches in either disk on any of the higher order pinions. As the register frame 27 is tumbled, the entire set of register pinions is moved bodily and as this occurs the "units" pinion is held by the nose on arm 184 so that said pinion is rotated one step counterclockwise as viewed in Figs. 5 and 7. A "fugitive 1" is thus inserted in a subtractive direction. It is to be noted that it is inserted into the register directly and as an incident to the shifting of the register from add to subtract position and that it does not trip the tens-transfer mechanism or any part of it. Thus, no spacing cycle is necessary because there are no parts that need be restored to normal.

If the "units" pinion should be in its "0" position under the conditions above assumed, the nose on the right-hand arm 190 of the yoke 181 will enter the notch in the disk 173 on the "units" pinion. This will allow the nose on the left-hand arm 192 of yoke 181 to enter one of the notches in disk 172 on the "tens" pinion. Then, when the register is tumbled both the "units" and the "tens" pinions will be moved one step in the subtracting direction. The "units" pinion is moved a step to insert the "fugitive 1" subtractively and the "tens" pinion is moved a step to effect the subtractive tens-transfer that should take place. If the "units" order add pinion and any number of successive next higher order add pinions are in the "0" position at the time the frame 27 is to be tumbled, the yoke 181 and the corresponding successive next higher order yokes 182, etc., will cause subtractive tens-transfers to the "tens" and successive higher orders up to and including the lowest order in which the add pinion does not stand at "0" immediately before the frame 27 is tumbled. The single notch in the disk 173 for the lowest order pinion not standing at "0" is out of alignment with the nose on the right-hand arm of the next higher order yoke so that, by reason of each yoke having a lug on its right-hand arm overlying the top edge of the left-hand arm of the next lower order yoke, said disk 173 holds the nose on the left-hand arm of not only the next but also all higher order yokes out of the notches in the disks 172. As the tens-transfers which are required by a subtractive entry of a "fugitive 1" always extend to and never beyond the lowest order in which the add pinions of the register stand at "0" immediately prior to the entry of the "fugitive 1," it will be clear that the mechanism above described always produces the correct effect when the register frame 27 is tumbled from the add to the subtract position.

Figure 6:
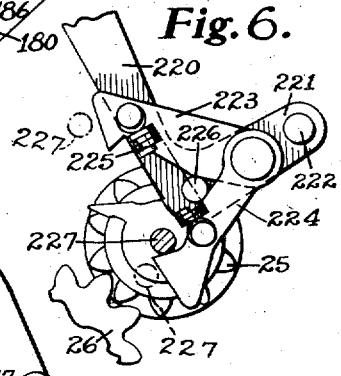
Fig. 6 is a detail left side elevation and section showing the position of some of the parts during the operation illustrated in Fig. 5.

Suppose the register is to be tumbled from the subtract position to the add position. If none of the add pinions 25 stand at their "9" positions (as determined by the positive total numerals on their dials 170), none of the yokes 181, 182, etc., will engage the noses of their right-hand arms in the single notches of the disks 173 and only the "units" order pinions 25 and 26 will be rotated one step in the adding direction as the frame 27 tumbles and carries the pinions counterclockwise (as viewed in Figs. 5, 6 and 7) relative to the frame 29 in which the shaft 175 supporting the yokes 180, 181, etc., is mounted. But, if the add pinion 25 in the units order and the add pinions 25 in some higher orders are in their "9" positions, the "tens" order yoke 181 will have the nose on its right-hand arm 190 engage in the single notch in the units order disk 173 and have the nose on its left-hand arm engage in one of the ten notches in the "tens" order disk 172 as the register is moved out of mesh with the actuators. If, at the same time, one or more successive next higher order add pinions 25 are in their "9" positions, the noses on the right-hand arms of the yokes in the orders up to and including the lowest order in which the add pinion 25 does not stand at "9" will also engage the noses on their right-hand arms in the single notches in the respective next lower order disks 173 and the noses on their left-hand arms will engage in notches in the disks 172 of the orders corresponding to said yokes. Consequently, when the frame 27 is tumbled from the subtract to the add position, not only the units order pinions but also the pinions in any higher orders, up to and including the lowest order in which the add pinion did not stand at its "9" position immediately before such tumbling of the frame 27, will be rotated one step in the adding direction. Tens-transfers to orders higher than the lowest order in which the add pinion 25 does not stand at "9" immediately before the tumbling of the frame 27 from subtract position to add position are prevented in the same way as tens-transfers to orders higher than the lowest order in which the add pinion does not stand at "0" immediately before the tumbling of said frame 27 from add position to subtract position are prevented. As the additive entry of a "fugitive 1," when the units order add pinion stands at "9" immediately before such entry, will always require additive tens-transfers up to but never beyond the lowest order pinion not standing at "9" immediately before the entry of the additive "fugitive 1," it will be clear that the mechanism described above also always produces the correct effect when the frame 27 is tumbled from the subtract to the add position.

Although tens-transfers from the "units" to the "tens" and higher orders are effected at the time of either a subtractive or an additive insertion of a "fugitive 1" if the insertion of the "fugitive 1" occurs under such conditions as to require tens-transfers, such tens-transfers are not effected by the regular tens-transfer mechanism but by a special mechanism operating while the register is out of engagement with the actuators and the tens-transfer mechanism and while any actuators which may have been out of normal position as the result of effecting tens-transfers during the previous cycle of operation are being returned to normal.

After the register has been tumbled and the "fugitive 1" has been inserted, and as the register is re-engaged with the actuators, the shaft 175 is again rocked clockwise by the pin 176 and cam slot 177, which results in disengaging the yokes from the disks 172 and 173. As long as the register frame 27 remains in the same position and is not tumbled, the noses on the arms of the yokes may enter notches in disks 172 and 173 when the register is disengaged from the actuators, but no "fugitive 1" will be entered. But, if the register is disengaged and tumbled from subtract to add position, or vice versa, a "fugitive 1" will be inserted. Referring to a total taking operation and to the description heretofore given of how the register is disengaged from the actuators at the beginning of a total taking cycle and tumbled in accordance with the sign of the total in the register, it will be clear that the "fugitive 1" is automatically inserted during the momentary disengagement and without displacing any parts that would require a spacing cycle for their restoration.

In order to prevent overthrow of the register pinions when they are moved by the "fugitive 1" mechanism while the register is out of engagement with the actuators, detents 200 are provided as shown in Fig. 7. These detents are spring urged toward the subtract pinions by springs 201 but are held out of engagement under certain conditions by arms 202 fixed to a shaft 203, the detents carrying studs 204 engaging projections on the arms 202. The shaft 203 is held in the position of Fig. 7 by an arm 205 carrying a stud 206 operating in a slot in a lever 207. When the register is in engagement with the actuators as shown in Fig. 7, the lever 207 holds the arm 205 in the position there shown and the shaft 203 with its arms 202 holds the detents 200 away from the register pinions. The lever 207 is pivoted near its center at 30 (Fig. 3) and on its rear end is a stud 209 operating in a slot in a bell crank detent 210 pivoted at 211. This bell crank detent has a cam end 212 operating on a spear point 213 on the main register frame. As shown in Fig. 3, the register is in engagement with the actuators. If the register is rocked out of engagement the spear point 213 rocks the detent 210 clockwise. This rocks the lever 207 counterclockwise and moves the arm 205 (Fig. 7) together with the shaft 203 counterclockwise to allow the detents 200 to move into engagement with the register pinions. Thus, as the register is moved out of engagement with the actuators, the spring detents 200 are moved into engagement with the pinions to prevent accidental rotation. These detents, while holding the pinions against overthrow or accidental rotation, do not interfere with their movement by the "fugitive 1" mechanism, the detents yielding in such case to allow the requisite movements.

Another condition that must be taken into account is the position of the control member 140 under certain special conditions of the register. As previously explained, this member 140 is controlled by the register pinions of highest order so that, when the register changes from positive to negative condition and vice versa, the member is moved from the solid line position to the dot-dash line position of Fig. 4, and vice versa. However, when the frame 27 is tumbled while the register is clear, as when the first amount to be entered after taking a total is of the algebraic sign opposite to that of said total, two special conditions arise. Because of the arrangement of the transfer projections on the subtract pinions 26 relative to those on the add pinions 25 and the arrangement of said transfer projections relative to the transfer pawls 288 and 287 respectively as disclosed in the above-mentioned Rinsche Patent 1,172,484 and in the therein-referred-to Rinsche Patent 1,179,564, the add pinions 25, though they are left in their "0" positions when cleared by a positive total-taking operation, are left in their "9" positions when cleared by a negative total-taking operation. If all of the add pinions 25 are in their "0" positions while the tumbling frame 27 is in its add position and said frame is then tumbled to its subtract position, all of the pinions 25 will be moved to their "9" positions. If, as would usually be the case, an amount is subtracted from the register during the cycle in which the frame 27 is tumbled to the subtract position in such a circumstance, the register would contain a negative total at the end of the cycle. However, as the movement of the highest order add pinion 25 from its "0" position to its "9" position and the simultaneous movement of the highest order subtract pinion 26 occurred while the register was out of mesh with the actuators, the usual transfer pawl 288 would be ineffective to shift the member 140 from its positive total position to its negative total position. Therefore, unless other means, effective under such a circumstance, were provided, the member 140 would incorrectly remain in the positive total position. Similarly, if all of the add pinions 25 are in their "9" positions while the frame 27 is in its subtract position and said frame 27 is then tumbled to its add position in a machine cycle in which an amount is added in the register, the latter would contain a positive total at the end of the cycle but the member 140 would incorrectly remain in its negative total position except for the means which will next be described. A member 220 (Fig. 5) is pivotally connected to one of the arms of the control member 140, the lower end of said arm 220 having a right angle forward extension 221 illustrated in Fig. 6. This extension carries a stud 222. Also, there are pivoted on this extension a pair of scissors members 223 and 224 which are urged toward one another by a spring 225. A stud 226 on member 220 holds these scissors members 223 and 224 in their normal positions illustrated in Fig. 6. The outer ends of the scissors members 223 and 224 have shoulders adapted to be engaged by the shaft 227 that carries the add pinions 225. When the register is tumbled from subtract to add position the shaft 227 moves close to the shoulder of the scissors member 223 and, then, when the register is moved toward the actuators, the shaft engages said shoulder to move the member 140 from negative to positive position through movement of the link 220. The spring 225 is strong enough to enable the scissors member 223 to move link 220 and control member 140 before the spring yields. As the register completes its movement toward the actuators, the shaft 227 moves past the scissors member 223 to the upper dot-dash position of Fig. 6. Thus, the control member 140 is moved to positive position when the register is tumbled from subtract to add position and engaged with the actuators even though the pawls 287 and 288 do not act to cause such movement.

The reverse action takes place when the register is tumbled from add to subtract position except that, in this case, the shaft 227 engages the shoulder on the scissors member 224 as the register is tumbled from add to subtract position, to thereby move the control member 140 from positive to negative position.

It might be concluded from the description just given that the scissors members 223 and 224 would cause a movement of the control member 140 each time the register was tumbled from add to subtract position and vice versa. Such action is not wanted and to prevent this a yoke 230 (Fig. 5) is mounted on the shaft 175, which yoke has a right-hand arm 231 provided with a nose adapted to engage the notch in the disk 173 on the pinion of highest order. This yoke extends a considerable distance to the left in Fig. 5 and its other arm 232 engages behind the stud 222 carried by the lower offset end 221 of the member 220. As long as there is any digit in the register, the yoke 230 is held clockwise and prevented from moving counterclockwise because, as previously explained, one of the yokes 180, 181 or 182 will engage the edge of one of the disks 173 and the overlapping tails 191, including tail 233, will prevent counterclockwise movement of the yoke 230. As long as this condition exists, the arm 232 of the yoke 230 engages the stud 222 and holds the lower end of the link 220 inactive to the right as viewed in Figs. 5 and 6, so that the scissors members 223 and 224 are out of the path of shaft 227. Accordingly, tumbling of the register has no effect on the negative total member 140 which is then controlled only by the register pinion of highest order and is moved in the event that said highest order pinion moves while the register is in engagement with the actuators. If, however, all of the add pinions 25 are at "0" when the frame is in the add position or all of the add pinions are at "9" when the frame 27 is in the subtract position and the frame 27 is then tumbled to the opposite position, the nose of the arm 231 of the yoke 230 will enter the notch in the disk 173 on the pinion of highest order and the arm 232 will move rearward to permit the lower end of the member 220 to be moved to the left by the spring 234 (Fig. 5) so that the shoulders on the scissors members 223 and 224 are in the path of the shaft 227. Under this condition, the shaft 227 is active to move the negative total member 140 in accordance with the add-subtract position of the register.

*Operation*

While the operation of the mechanism should be clear from the prior description, a brief summary will be made.

When an operator desires to take a total he simply depresses the total key and gives the machine a single cycle of operation. Depression of the total key conditions the mechanism that momentarily rocks the register out of engagement with the actuators and almost immediately re-engages it. The total key also conditions the mechanism that causes the tripped actuators and tens-transfer pawls to be restored at the beginning of the cycle, provision being made for properly aligning the actuators before the register is re-engaged with them. Depression of the total key also conditions certain other mechanism which is controlled by the register in accordance with the sign of the total in it so that, in the event the register must be tumbled from add to subtract position or vice versa while it is momentarily disengaged, such action will automatically take place. No spacing cycle is required. The tumbling takes place at the very beginning of a total taking cycle and before the registers are engaged for the totaling operation. In the event the registers are tumbled from one position to the other a "fugitive 1" is automatically inserted in the register without disturbing the tens-transfer mechanism and without moving any parts that must be restored prior to the total taking operation. Thus the machine is automatically conditioned at the beginning of a total taking cycle to take the total of a sign corresponding to the total in the register and such total is taken by a single cycle of machine operation immediately following the item entering cycle. This is believed to be new in a machine in which the register is normally engaged with the actuators and in a machine in which tens-transfers are caused by extra steps of movement of the actuators.

It is to be understood that the structure shown is for purposes of illustration only and that variations may be made in it without departing from the spirit and scope of the invention as defined by the appended claims.

I claim:

1. A calculating machine of the class described having a plurality of actuators, an add subtract register, mechanism for movably supporting said register for engagement with the actuators in different relations for addition and positive total taking, and subtraction and true negative total taking, respectively, means for shifting said register to condition it for either type of engagement, and means operating to enter a fugitive one in said register during said shifting movement.

2. The combination in a calculating machine of the class described adapted to be given cycles of operation and having driving means, portions driven by said driving means during said cycles of operation, a plurality of actuators, a register normally connected to said actuators, a tens-transfer mechanism operable to effect tens transfers by an extra step of movement of said actuators, and total-taking control means; of means governed by said total-taking control means and operated by part of said driven portions at the beginning of a total-taking machine cycle for momentarily disconnecting said register and actuators and then reconnecting them in time for said register to control said actuators in total taking, and means operated by part of said driven portions for restoring to normal the portions of said tens-transfer mechanism and the actuators that may have been moved an extra step in tens transfers, during the momentary period while said register and actuators are disconnected.

3. The combination in a calculating machine of the class described adapted to be given cycles of operation and having driving means, portions driven by said driving means during said cycles of operation, a plurality of actuators, zero stops for holding said actuators in zero position, a register normally connected to said actuators, tens-transfer mechanism operable to effect tens transfers by an extra step of movement of said actuators, and total-taking control means; of means controlled by said total-taking control means and operated by part of said driven portions at the beginning of a total-taking machine cycle for momentarily disconnecting and reconnecting said register and actuators to enable the actuators that may have been moved in tens transfers to be restored to zero positions determined by said zero stops, means for restoring to normal the portions of said tens-transfer mechanism and the actuators that may have been moved in tens transfers, while said register and actuators are momentarily disconnected and means for releasing said zero stops immediately after said register and actuators have been reconnected to enable the actuators to move under the control of the register in total taking.

4. The combination in a calculating machine of the class described having means for giving it cycles of operation, a plurality of actuators, an add-subtract register normally connected to said actuators, said register being movable from an add to a subtract position and vice versa, and a total-taking control means; of means controlled by said total-taking control means operating automatically at the beginning of a total-taking machine cycle to momentarily disconnect said register and actuators and to reconnect them in time to enable said register to control said actuators in total taking, means operating to change said register from add to subtract position or vice versa, as the case may be, while said register and actuators are momentarily disconnected, and means for restoring said tens-transfer mechanism to normal while said register and actuators are momentarily disconnected.

5. A calculating machine of the class described having a plurality of actuators, an add-subtract register connectible to said actuators in one relation for addition and in another relation for subtraction, means for connecting and disconnecting said register and actuators, means for changing the add-subtract relation of said register and actuators, and means operating automatically while said register and actuators are disconnected to insert a "fugitive 1" in said register when the add-subtract relation of said register and actuators is changed.

6. A machine of the class described having a plurality of actuators, an add-subtract register movable from an add to a subtract position and vice versa, means for connecting and disconnecting said register and actuators, means for moving said register from its add to its subtract position and vice versa while it is disconnected from said actuators, and means conditioned by said register as it is disconnected from said actuators and operating automatically when said register is moved from add to subtract position and vice versa and while said register and actuators are disconnected to insert a "fugitive 1" into said register.

7. A calculating machine of the class described having a plurality of actuators, an add-subtract register connectible to said actuators, means for connecting and disconnecting said register and actuators, means for moving said register from an add to a subtract position and vice versa while it is disconnected from said actuators, and means operated by said register during its movement from add to subtract position and vice versa and while it is disconnected from said actuators for inserting a "fugitive 1" in said register.

8. A calculating machine of the class described having means for giving it cycles of operation, a plurality of actuators, a register normally connected to said actuators, said register being connectible to said actuators in one relation for addition and in another relation for subtraction, means operable at the beginning of a machine cycle for momentarily disconnecting said register and actuators and for reconnecting the same, means operable to change the add-subtract relation of the register and actuators while said register and actuators are disconnected, and means automatically operating to insert a "fugitive 1" in said register when said relation is changed and while said register and actuators are disconnected.

9. A calculating machine of the class described having a plurality of actuators, a register connectible to said actuators in one relation for addition and in another relation for subtraction, means for momentarily disconnecting said register from said actuators and then reconnecting them, means operable to change the add-subtract relation of said register and actuators while they are disconnected, and means automatically operable to insert a "fugitive 1" in said register when the add-subtract relation of said register and actuators is changed and while they are disconnected, said "fugitive 1" means including portions operable to move the register pinions of orders higher than the "units" order in the event the insertion of a "fugitive 1" calls for such movement of said higher order pinions.

10. A calculating machine of the class described having a plurality of actuators, an add-subtract register normally connected to said actuators, a tens-transfer mechanism operating to effect tens transfers by an extra step of movement of said actuators, means operable to disconnect said register from said actuators and to change said register from an add to a subtract position and vice versa, and means operating automatically to insert a "fugitive 1" in said register while it is disconnected and as it is changed from add to subtract position and vice versa.

11. The combination in a calculating machine of the class described having means for giving it cycles of operation, a plurality of actuators, an add-subtract register normally connected to said actuators, said register and actuators being connectible in one relation for addition and another relation for subtraction, means for changing the add-subtract relation of said register and actuators, and a total-taking control means; of means controlled by said total-taking control means for momentarily disconnecting and reconnecting said register and said actuators at the beginning of a total-taking machine cycle, and means controlled by said register in accordance with the sign of the total therein and conditioned by said total-taking control means as the latter is conditioned for total taking acting automatically to change the add-subtract relation of said register and actuators while they are momentarily disconnected.

12. The combination in a calculating machine of the class described having means for giving it cycles of operation, a plurality of actuators, an add-subtract register normally connected to said actuators, said register and actuators being connectible in one relation for addition and another relation for subtraction, means for changing the add-subtract relation of said register and actuators, and a total-taking control means; of means controlled by said total-taking control means for momentarily disconnecting and reconnecting said register and actuators at the beginning of a total-taking machine cycle, means controlled by said register in accordance with the sign of the total therein and conditioned by said total-taking control means operating automatically to change the add-subtract relation of said register and actuators while they are momentarily disconnected, and means automatically operating to insert a "fugitive 1" in said register when the add-subtract relation of said register and actuators is changed while they are disconnected.

13. The combination in a machine of the class described having means for giving it cycles of operation, a plurality of actuators, an add-subtract register connectible to said actuators in one relation to perform addition and to yield positive totals and in another relation to perform subtraction and yield true negative totals directly, said register and actuators being normally connected together, means for changing the add-subtract relation of said register and actuators, and total-taking control means; of means controlled by said total-taking control means for momentarily disconnecting and reconnecting said register and actuators at the beginning of a total-taking machine cycle, means controlled jointly by said register in accordance with the sign of a total therein and by said total-taking control means operating to change the add-subtract relation of said register and said actuators while they are momentarily disconnected, and means automatically operating to insert a "fugitive 1" in said register when said relation is changed and while said register and actuators are momentarily disconnected, to thereby enable a positive or true negative total to be taken directly by a single cycle of machine operation immediately following an item entering cycle.

14. The combination in a machine of the class described having means for giving its cycles of operation, a plurality of actuators, an add-subtract register normally connected to said actuators, said register being movable from an add to a subtract position and vice versa, a tens-transfer mechanism operable to effect tens transfers by an extra step of movement of said actuators, and a total-taking control means; of means controlled by said total-taking control means for momentarily disconnecting and reconnecting said register and actuators at the beginning of a total-taking machine cycle, means for restoring to normal the portions of said tens-transfer mechanism and of the actuators that may have moved by reason of tens transfers while said register and actuators are momentarily disconnected, means controlled by said register in accordance with the sign of the total therein and controlled by said total taking control means for changing the add-subtract position of said register while it is momentarily disconnected from said actuators, and means automatically operating to insert a "fugitive 1" in said register when it is moved from add to subtract position and vice versa and while it is momentarily disconnected, whereby a positive or a true negative total may be taken directly from said register by a single cycle of machine operation immediately following an item entering cycle.

15. The combination in a calculating machine of the class described adapted to be given cycles of operation and having driving means, portions driven by said driving means during said cycles of operation, a plurality of actuators, a register normally connected to said actuators, a tens-transfer mechanism operable to effect tens transfers by an extra step of movement of said actuators, and total-taking control means; of means operated by part of said driven portions at the beginning of a total-taking machine cycle and governed by said total-taking control means for momentarily disconnecting said register and actuators and then reconnecting them in time for said register to control said actuators in total taking, and means operated by part of said driven portions for restoring to normal the portions of said tens-transfer mechanism and the actuators that may have been moved an extra step in tens transfers, during the momentary period while said register and actuators are disconnected.

16. A machine of the class described having means to drive it through cycles of operation, differential actuators, an adding and subtracting register connectible with said actuators in one relation for adding and positive total taking and in another relation for subtracting and negative total taking and normally connected with said actuators while said machine is at rest, total-taking control means to cause said register to control said actuators in total-taking machine cycles, means operable by said driving means at the beginning of a machine cycle and conditionable by said total-taking control means to momentarily disconnect said register from and reconnect it with said actuators prior to total-taking movement of said actuators, and means governed by said register in accordance with the sign of the total therein and controlled by said total-taking control means to condition said register, while it is momentarily disconnected from said actuators at the beginning of a total-taking cycle, for reconnection with said actuators in that relation which corresponds to the sign of the total contained in said register.

17. A machine of the class described having means to drive it through cycles of operation, differential actuators, a register, means to condition said register for connection with said actuators in one relation for addition and positive total taking and in another relation for subtraction and negative total taking, total-taking control means, means governed by said register in accordance with the sign of the total therein and controlled by said total-taking control means at the beginning of a total-taking machine cycle to condition said register for connection with said actuators in the relation corresponding to the sign of the total in said register, and means controlled by said register upon conditioning thereof for change of the relation of engagement with said actuators at the beginning of said total-taking cycle to enter a "fugitive 1" into said register.

ARTHUR J. FETTIG.